ANALOG COMPUTER AMPLIFIER WITH TRANSFORMER INPUT

Filed April 15, 1959 2 Sheets-Sheet 1

INVENTOR.
JEAN C. LEJON
BY
John F. Lukes
ATTORNEY

Nov. 17, 1964 J. C. LEJON 3,157,782

ANALOG COMPUTER AMPLIFIER WITH TRANSFORMER INPUT

Filed April 15, 1959 2 Sheets-Sheet 2

INVENTOR.
JEAN C. LEJON
BY John F. Lukes
ATTORNEY

United States Patent Office 3,157,782
Patented Nov. 17, 1964

3,157,782

ANALOG COMPUTER AMPLIFIER WITH TRANSFORMER INPUT

Jean C. Lejon, Paris, France, assignor to Controle Bailey, Paris, France, a company of France Filed Apr. 15, 1959, Ser. No. 806,628
Claims priority, application France May 6, 1958
2 Claims. (Cl. 235—193)

This invention relates to analog devices and more particularly to devices capable of performing computations such as addition, subtraction, multiplication by a constant or introducing desired characteristics into an electrical signal.

One common circuit for achieving the above functions comprises an electric amplifier to which an input signal is supplied through a primary resistance element. The amplifier is provided with an external negative feedback circuit containing an impedance element which may take the form of a resistance or capacitor or combination thereof depending on the particular function or control action desired.

If the feedback impedance comprises a resistance a multiplying or proportional action will be obtained, the output signal being equal to the input signal multiplied by the gain of the circuit or the ratio of the feedback resistance to the primary input resistance. The summation of two signals can be achieved by applying signals of the same polarity to the input. Likewise subtraction can be achieved by providing a device to invert the polarity of one of the input signals relative to the other. By utilizing a capacitor in the feedback circuit an output signal can be obtained which is proportional to the integral of the total input signal.

As is well known to those skilled in the art the above functions are only a few of the many which may be achieved with a circuit of the described type. However, as will also be appreciated by those skilled in the art, one limitation on the use of such circuits is the difference in the polarity of the output signal with respect to the input signal. This inversion of sign between the input and output of the circuit is objectionable in many instances wherein an output signal of the same polarity is desired.

Another limitation on the use of such circuits is the fact that to subtract signals of the same polarity, it is often necessary to provide a separate amplifier merely for the purpose of inverting the polarity of one signal. The additional cost involved is substantial thus limiting the use of such analog devices in many applications where subtraction is desired.

It is the principal object of this invention to provide an analog device which produces an output signal of the same polarity as the input signal.

Another object of this invention is to provide a transformer input to an analog device.

Another object of the invention is to provide an analog device for directly adding and/or subtracting a pluraltiy of electric signals of the same polarity or of different polarity.

Other objects and advantages of the invention will become apparent from the following description taken in connection with the accompanying drawings wherein.

Figure 1:
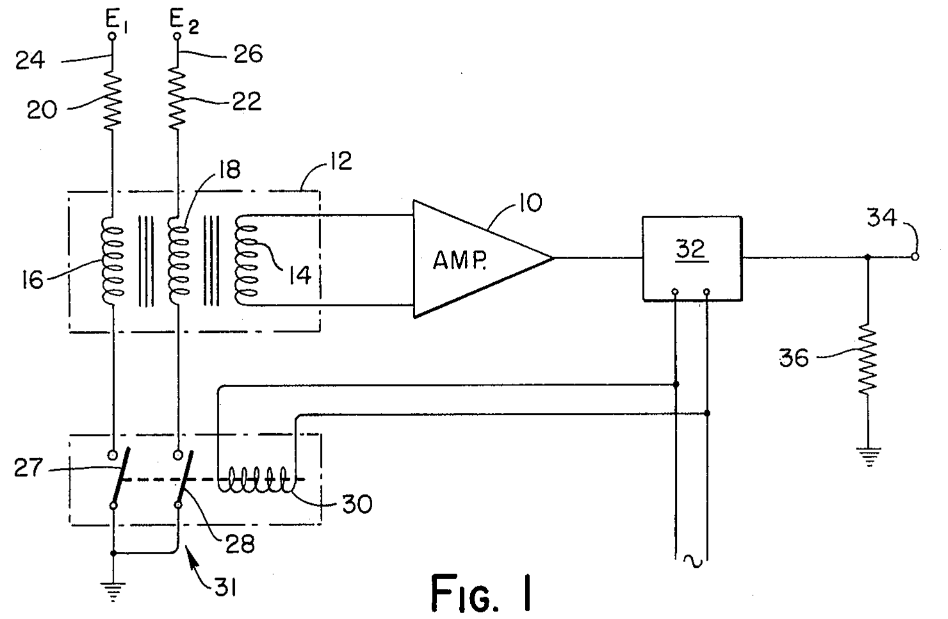
FIG. 1 is a schematic illustration of the circuit of an analog device embodying this invention.

Referring to FIG. 1 of the drawings, the analog device embodying this invention in general comprises an alternating current amplifier 10 and an input transformer indicated generally by the reference numeral 12. The transformer 12 is provided with a secondary winding 14 coupled to the input of the amplifier 10 and a pair of oppositely wound primary windings 16 and 18 which are connected in series with a pair of resistors 20 and 22 and input terminals 24 and 26. The terminals 24 and 26 are adapted to be connected to direct voltage signal sources as will later be described.

The primary windings 16 and 18 are connected through a pair of switches 27 and 28 respectively to a common ground connection. The switches 27 and 28 in combination with a periodically energized relay coil 30 provide a converter or modulator 31 for converting the D.-C. signals applied to the windings 16 and 18 into alternating signals to establish an alternating input to the amplifier 10. The coil 30 is energized by a suitable A.-C. source as indicated schematically and is effective to open and close the switches 27 and 28 at a predetermined frequency. Such a converting means is well known to those skilled in the art as a "chopper," and further description is deemed unnecessary.

The alternating signal induced in the secondary winding 14 is amplified in amplifier 10 and fed into a phase discriminator 32 which converts the alternating signal into a D.-C. signal of reversible polarity at output terminal 34. A resistor 36 is connected from the output terminal 34 to ground to constitute a load on the output signal.

Considering now the operation of the transformer 12, by properly sizing the resistors 20 and 22, the self-induction of the windings 16 and 18 can be rendered negligible at the frequency of "chopping." If $N_{16}$ and $N_{18}$ are the number of turns on the primaries, $E_1$ and $E_2$ the applied direct voltage signals, and $R_{20}$ and $R_{22}$ the resistance values of resistors 20 and 22, the ampere turns of the windings 16 and 18 are respectively proportional to:

$$\frac{N_{16}E_1}{R_{20}}$$

and $$\frac{N_{18}E_2}{R_{22}}$$

From the above it will be apparent that if direct voltage signals $E_1$ and $E_2$ are applied to the terminals 24 and 26 respectively the signal induced into the secondary winding and the output appearing at terminal 34 will be proportional to $E_2—E_1$ as a result of the difference in the direction of winding of the primaries 16 and 18. In effect, the primary winding 16 reverses the sign of the voltage signal applied to terminal 24 relative to the voltage signal applied to the terminal 26.

The signal induced into the secondary winding and the output appearing at terminal 34 will be thus proportional to $E_2—E_1$ as a result of the difference in the direction of winding of the primaries 16 and 18. Accordingly, it will be apparent that subtraction of two signals having the same or different polarity may be achieved without the use of an external amplifier or other device to invert the polarity of one of the signals as was discussed in connection with the prior art.

Figure 2:
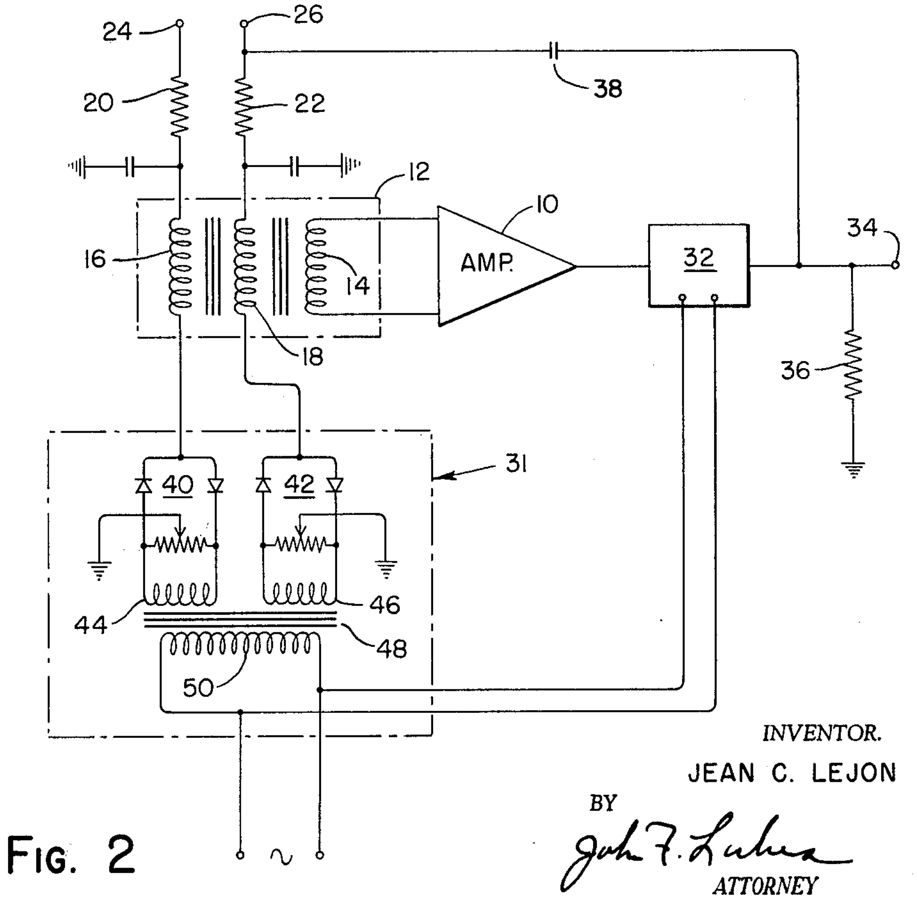
FIGS. 2 and 3 are schematic illustrations of other embodiments of the invention.

Referring now to FIG. 2 of the drawings, there is shown an analog device having the same basic circuit as the device illustrated in FIG. 1 but further including an external feedback circuit comprising a capacitor 38 connected between the terminal 34 and the input terminal 26. The capacitor 38 is effective to produce an output signal at terminal 34 proportional to the integral of the input signal.

The arrangement illustrated in FIG. 2 also differs from that illustrated in FIG. 1 in the structure and circuitry of the converter 31. In FIG. 2 this converter is equivalent in function but differs in the provision of a pair of half wave diode rectifying circuits 40 and 42 energized by a pair of secondary windings 44 and 46 of a transformer 48 having a primary winding 50 coupled to a source of alternating voltage. The circuits 40 and 42 are effective to convert the D.-C. signals applied to terminals 24 and 26 respectively into alternating signals similar to the converter 31 illustrated in FIG. 1.

In operation of the circuit illustrated in FIG. 2, if the input signal is applied to terminal 24, the polarity thereof is in effect reversed in winding 16 relative to the feedback signal established in winding 18 to thereby produce an output signal at terminal 34 of the same polarity as the input signal and proportional to the integral thereof. On the other hand application of an input signal to terminal 26 will produce an output signal at terminal 34 proportional to the integral but opposite in polarity. By applying input signals to both terminals 24 and 26 an output signal will be obtained proportional to the integral of the difference of the two signals.

Figure 3:
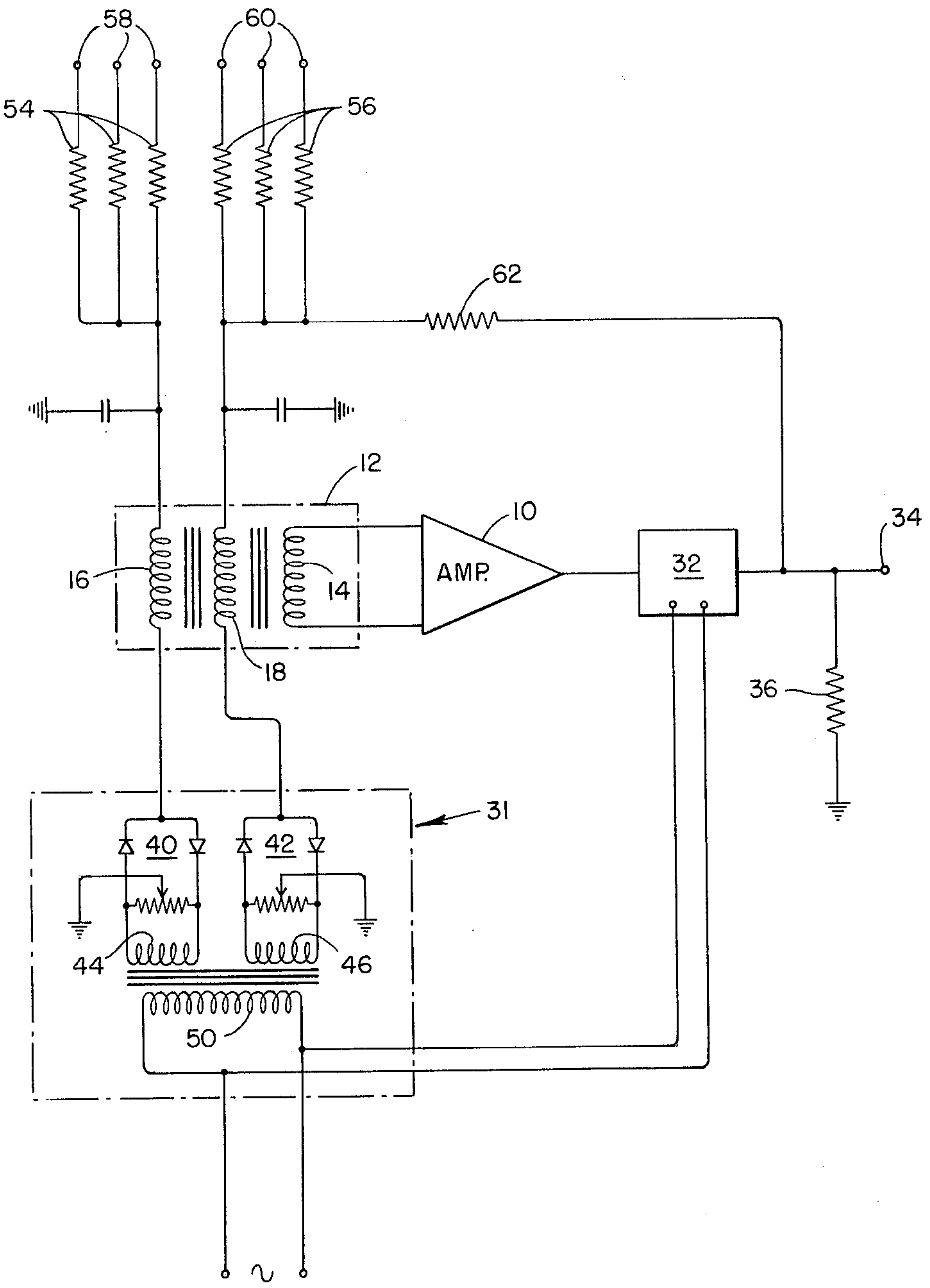

Referring now to FIG. 3 of the drawings, there is shown an analog device for achieving proportional action and for summing and/or subtracting a number of variables. More particularly, there is shown a plurality (in this case 3) of resistors 54 connected to a common junction in series with the winding 16 and an equal number of resistors 56 connected to a second common junction in series with the winding 18. Input terminals 58 and 60 are provided for providing separate input signals to the resistors 5 4and 56. The voltage drop across each resistor is equal to the voltage signal applied to its associated input terminal. Thus, the voltage signal applied to primary winding 16 is proportional to the sum of the input signals applied to terminals 58 while the voltage applied to secondary winding 18 is proportional to the sum of the input signals applied to terminals 60 minus the voltage drop across a feedback resistor 62 connected between the output terminal 34 and the common junction of resistors 56.

In operation of the embodiment shown in FIG. 3, if the gain of the amplifier 10 is large and the primary windings have equal turns, the output voltage appearing at terminal 34 will be proportional to the sum of the signals supplied to terminals 60 minus the sum of the signals supplied to terminals 58 multiplied by the gain of the amplifier. In effect the winding 16 serves to reverse the polarity of the signal applied to winding 16 representative of the sum of the signals applied to terminals 58 to thereby effect subtraction of the signals applied to terminals 58 from those applied to terminals 60.

It will be apparent that the several applications of the invention herein shown or described are only a few of many possible applications, and therefore, the disclosed specific applications are for purposes of illustration rather than limitation. It will also be apparent that many changes may be made in the construction and arrangement of parts without departing from the scope of the invention as defined in the appended claims.

It is claimed and desired to secure by Letters Patent of the United States:

1. An analog device for producing a D.-C. output signal of the same polarity as a D.-C. input signal, comprising, an electronic A.-C. amplifier having an input and an output circuit, means for establishing a positive D.-C. feedback signal corresponding to the A.-C. signal in said output circuit, means for establishing a D.-C. input signal of the same polarity as said feedback signal and means including interrupting and transformer means having oppositely wound primary windings for impressing upon said input circuit an A.-C. potential corresponding to the difference between said like polarity D.-C. input and feedback signals.

2. An analog device comprising, an electronic A.-C. amplifier circuit having an input and output, an input transformer having a secondary winding coupled to the input of said amplifier and a pair of oppositely wound primary windings, a plurality of resistors connected to a common junction with one of said primary windings for applying D.-C. voltage signals to be added by said one primary winding, a plurality of resistors connected to a second common junction with the other of said primary windings for applying D.-C. voltage signals to said other winding to be algebraically added to the signal supplied to said one winding, and interrupting means for converting the D.-C. voltage signals applied to both said primary windings to alternating voltage signals.

References Cited in the file of this patent

UNITED STATES PATENTS

| | | |
|---|---|---|
| 2,497,129 | Liston | Feb. 14, 1950 |
| 2,574,438 | Rossi | Nov. 6, 1951 |
| 2,741,668 | Iffland | Apr. 10, 1956 |
| 2,885,612 | Larsen | May 5, 1959 |
| 2,941,722 | Van Allen | June 21, 1960 |
| 3,018,051 | Hemstreet | Jan. 23, 1962 |
| 3,089,097 | Bell | May 7, 1963 |